(12) United States Patent
Park et al.

(10) Patent No.: US 10,196,044 B2
(45) Date of Patent: Feb. 5, 2019

(54) RAIN SENSOR OF VEHICLE, AND METHOD OF CONTROLLING THE SAME

(71) Applicants: HYUNDAI MOTOR COMPANY, Seoul (KR); KIA MOTORS CORPORATION, Seoul (KR); HYUNDAI AUTRON CO., LTD., Seongnam-si, Gyeonggi-do OT (KR)

(72) Inventors: Jong Min Park, Seoul (KR); Nak Kyoung Kong, Seongnam-si (KR); Keun Sig Lim, Yongin-si (KR); Ki Hong Lee, Seoul (KR); Illsoo Kim, Suwon-si (KR); Byung Seob Yu, Hwaseong-si (KR); KyungTaek Kim, Anyang-si (KR); WonBok Hong, Hwaseong-si (KR); Taewang Kim, Seongnam-si (KR)

(73) Assignees: HYUNDAI MOTOR COMPANY, Seoul (KR); KIA MOTORS CORPORATION, Seoul (KR); HYUNDAI AUTRON CO., LTD., Seongnam-si (KR)

( * ) Notice: Subject to any disclaimer, the term of this patent is extended or adjusted under 35 U.S.C. 154(b) by 0 days.

(21) Appl. No.: 15/385,624

(22) Filed: Dec. 20, 2016

(65) Prior Publication Data
US 2018/0105139 A1    Apr. 19, 2018

(30) Foreign Application Priority Data
Oct. 14, 2016    (KR) .......................... 10-2016-0133574

(51) Int. Cl.
*G01S 17/88*    (2006.01)
*B60S 1/08*    (2006.01)

(52) U.S. Cl.
CPC ........... *B60S 1/0833* (2013.01); *B60S 1/0818* (2013.01); *G01S 17/88* (2013.01)

(58) Field of Classification Search
CPC ..... B60W 1/0833; B60W 50/10; G01S 17/88; G01N 21/1717; C12N 11/14
(Continued)

(56) References Cited

U.S. PATENT DOCUMENTS 5,923,027 A    7/1999  Stam et al.
5,998,183 A *  12/1999 Le Fevre ............... C12N 11/14
                                                   435/116
(Continued)

FOREIGN PATENT DOCUMENTS

JP           4717075 B2      4/2011
JP        2011-252856 A     12/2011
(Continued)

OTHER PUBLICATIONS

Goermer et al., Vision-based rain sensing with an in-vehicle camera, 2009, IEEE, p. 279-284 (Year: 2009).*

(Continued)

*Primary Examiner* — McDieunel Marc
(74) *Attorney, Agent, or Firm* — Knobbe Martens Olson & Bear LLP

(57) ABSTRACT

A rain sensor of a vehicle and a control method thereof are provided to solve a problem that a measurement result of rainfall varies according to a glass specification of a windshield even under the same rainfall condition by tuning sensitivity of the rain sensor in accordance with the glass specification of the windshield. For this, a method of determining the glass specification of the rain sensor includes determining the glass specification of the windshield from a light-receiving signal obtained by receiving light reflected by the windshield of the vehicle, and eliminating a deviation
(Continued)

between light-receiving signals by glass specification, which is caused by a difference in the glass specification, by applying parameter tuning according to a glass specification to the light-receiving signal.

20 Claims, 7 Drawing Sheets

(58) Field of Classification Search
USPC .......................................................... 701/36
See application file for complete search history.

(56) References Cited

U.S. PATENT DOCUMENTS

| | | | | |
|---|---|---|---|---|
| 6,118,383 | A * | 9/2000 | Hegyi | B60S 1/0818 15/DIG. 15 |
| 6,559,466 | B2 | 5/2003 | Weber | |
| 7,034,932 | B2 * | 4/2006 | Kobayashi | B60S 1/0818 250/227.25 |
| 8,471,513 | B2 * | 6/2013 | Han | B60S 1/0837 250/208.1 |
| 9,317,754 | B2 * | 4/2016 | Hirai | G06K 9/00798 |
| 2001/0042822 | A1 * | 11/2001 | Hochstein | B60S 1/0822 250/227.25 |
| 2003/0127583 | A1 * | 7/2003 | Bechtel | B60R 1/088 250/216 |
| 2007/0272884 | A1 | 11/2007 | Utida et al. | |
| 2014/0241589 | A1 * | 8/2014 | Weber | G06K 9/00791 382/108 |
| 2015/0217781 | A1 * | 8/2015 | Lee | B60W 50/10 701/1 |
| 2017/0190319 | A1 * | 7/2017 | Kim | G01N 21/1717 |
| 2017/0291582 | A1 * | 10/2017 | Park | B60S 1/0837 |

FOREIGN PATENT DOCUMENTS

| | | |
|---|---|---|
| KR | 10-0727353 B1 | 6/2007 |
| KR | 10-1254131 B1 | 5/2013 |
| WO | 2015/182803 A1 | 12/2015 |

OTHER PUBLICATIONS

Choi, Omni-directional rain sensor utilizing scattered light reflection by water particle on automotive windshield glass, 2011, IEEE, p. 1-4 (Year: 2011).*

Ucar et al., The design and implementation of rain sensitive triggering system for windshield wiper motor, 2001, IEEE, p. 329-336 (Year: 2001).*

Cord et al., Towards rain detection through use of in-vehicle multipurpose cameras, 2011, IEEE, p. 833-838 (Year: 2011).*

* cited by examiner

RAIN SENSOR OF VEHICLE, AND METHOD OF CONTROLLING THE SAME

CROSS-REFERENCE TO RELATED APPLICATION

This application claims the benefit of Korean Patent Application No. 10-2016-0133574, filed on Oct. 14, 2016 in the Korean Intellectual Property Office, the disclosure of which is incorporated herein by reference.

BACKGROUND

1. Field

Embodiments of the present disclosure relate to a vehicle, and more particularly to a rain sensor of a vehicle.

2. Description of the Related Art

With a development of an electronic control technology and a sensor technology, an automatic control technology using various types of sensors has been applied to a vehicle.

An automatic control of a wiper using a rain sensor is one of the automatic controls in a vehicle. In the automatic control of a wiper using a rain sensor, whether it is rainy or not and rainfall are measured by detecting moisture on a surface of a windshield using the rain sensor, and a drive and speed of the wiper are automatically controlled in accordance with the rainfall measured when it is rainy.

The disclosure of this section is to provide background of the invention. Applicant notes that this section may contain information available before this application. However, by providing this section, Applicant does not admit that any information contained in this section constitutes prior art.

SUMMARY

A rain sensor of a vehicle emits light to the windshield and measures the rainfall through an amount of reflected light. In other words, whether it is rainy or not and the rainfall are measured through a difference in the amount of reflected light between when there is moisture on the surface of the windshield and when there is not. A measurement result of rainfall may vary depending on a glass specification of the windshield even under the same rainfall condition, and thus automatic control of wiper may be unreliable due to different properties of windshield glasses.

In accordance with one aspect of the present disclosure, a method of determining a glass specification of a rain sensor includes determining a glass specification of a windshield from a light-receiving signal obtained by receiving light reflected by the windshield of a vehicle, and eliminating a deviation between light-receiving signals by glass specification, which is caused by a difference in the glass specification, by applying parameter tuning according to a glass specification to the light-receiving signal.

In the method of determining a glass specification of a rain sensor, the glass specification of the windshield may be determined through a frequency analysis of the light-receiving signal.

In the method of determining a glass specification of a rain sensor, the parameter tuning according to a glass specification may include at least one of offset removal, phase inversion, sensitivity correction, and amplitude correction of the light-receiving signal.

In the method of determining a glass specification of a rain sensor, when the glass specification of the windshield matches up with a pre-determined glass specification through a frequency analysis of the light-receiving signal, the deviation may be eliminated by applying parameter tuning corresponding to the glass specification.

In the method of determining a glass specification of a rain sensor, when the glass specification of the windshield does not match up with the pre-determined glass specification, sensitivity of the rain sensor may be raised and a detection voltage of the rain sensor may be measured, and when the detection voltage of the rain sensor is not within a normal range, an error signal indicating that the rain sensor does not normally operate may be generated.

In the method of determining a glass specification of a rain sensor, when the detection voltage of the rain sensor is measured, the sensitivity of the rain sensor may be adjusted to the maximum.

In accordance with another aspect of the present disclosure, a method of measuring rainfall by a rain sensor includes determining a glass specification of a windshield from a light-receiving signal obtained by receiving light reflected by the windshield of a vehicle, eliminating a deviation between light-receiving signals by glass specification, which is caused by a difference in the glass specification, by applying parameter tuning according to a glass specification to the light-receiving signal, and estimating rainfall on a surface of the windshield from a magnitude of the light-receiving signal from which the deviation is eliminated.

In the method of measuring rainfall by a rain sensor, the glass specification of the windshield may be determined through a frequency analysis of the light-receiving signal.

In the method of measuring rainfall by a rain sensor, the parameter tuning according to a glass specification may include at least one of offset removal, phase inversion, sensitivity correction, and amplitude correction of the light-receiving signal.

In the method of measuring rainfall by a rain sensor, when a glass specification of the windshield matches up with a pre-determined glass specification through the frequency analysis of the light-receiving signal, the deviation may be eliminated by applying parameter tuning corresponding to the glass specification.

In the method of measuring rainfall by a rain sensor, when the glass specification of the windshield does not match the pre-determined glass specification, sensitivity of the rain sensor may be raised and a detection voltage of the rain sensor may be measured, and when the detection voltage of the rain sensor is not within a normal range, an error signal indicating that the ran sensor does not normally operate may be generated.

In the method of measuring rainfall by a rain sensor, when the detection voltage of the rain sensor is detected, the sensitivity of the rain sensor may be adjusted to the maximum.

In accordance with still another aspect of the present disclosure, a method of controlling a wiper of a vehicle includes generating a rain sensor control signal for activating a rain sensor when a wiper operating means of the vehicle is set to an 'AUTO' mode, determining a glass specification of a windshield from a light-receiving signal obtained by receiving light reflected by the windshield of the vehicle in response to the rain sensor control signal, eliminating a deviation between light-receiving signals by glass specification, which is caused by a difference in the glass specification, by applying parameter tuning according to a glass specification to the light-receiving signal, estimating rainfall on a surface of the windshield from a magnitude of the light-receiving signal from which the deviation is eliminated, and generating a wiper control signal for controlling speed of the wiper to correspond to the estimated rainfall.

In accordance with still another aspect of the present disclosure, a vehicle includes a rain sensor which determines a glass specification of a windshield from a light-receiving signal obtained by receiving light reflected by the windshield of the vehicle, eliminates a deviation between light-receiving signals by glass specification, which is caused by a difference in the glass specification, by applying parameter tuning according to a glass specification to the light-receiving signal, and estimates rainfall on a surface of the windshield from a magnitude of the light-receiving signal from which the deviation is removed, and a control unit which generates a wiper control signal for controlling speed of a wiper to correspond to the estimated rainfall.

In the vehicle described above, the rain sensor may determine the glass specification of the windshield through a frequency analysis of the light-receiving signal.

In the vehicle described above, the rain sensor may perform at least one of offset removal, phase inversion, sensitivity correction, and amplitude correction of the light-receiving signal when the parameter tuning according to a glass specification is performed.

In the vehicle described above, when the glass specification of the windshield matches up with a pre-determined glass specification, the rain sensor may eliminate the deviation by applying parameter tuning corresponding to the glass specification.

In the vehicle described above, when the glass specification of the windshield does not match up with the pre-determined glass specification, the rain sensor may raise sensitivity of the rain sensor and measure a detection voltage of the rain sensor, and, when the detection voltage of the rain sensor is not within a normal range, the rain sensor may generate an error signal indicating that the rain sensor does not normally operate.

In the vehicle described above, when the detection voltage of the rain sensor is measured, the sensitivity of the rain sensor may be adjusted to the maximum.

In accordance with still another aspect of the present disclosure, a rain sensor includes a light-emitting unit which emits light to a windshield of a vehicle and a light-receiving unit which receives light reflected by the windshield and generates a light-receiving signal, in which a glass specification of the windshield may be determined from the light-receiving signal and a deviation between light-receiving signals by glass specification, which is caused by a difference in the glass specification, by applying parameter tuning according to a glass specification to the light-receiving signal.

According to one aspect of the present disclosure, it is possible to obtain an accurate rainfall measurement result even under a condition of various glass specifications by solving a problem that a measurement result of rainfall varies according to a glass specification of a windshield even under the same rainfall condition.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
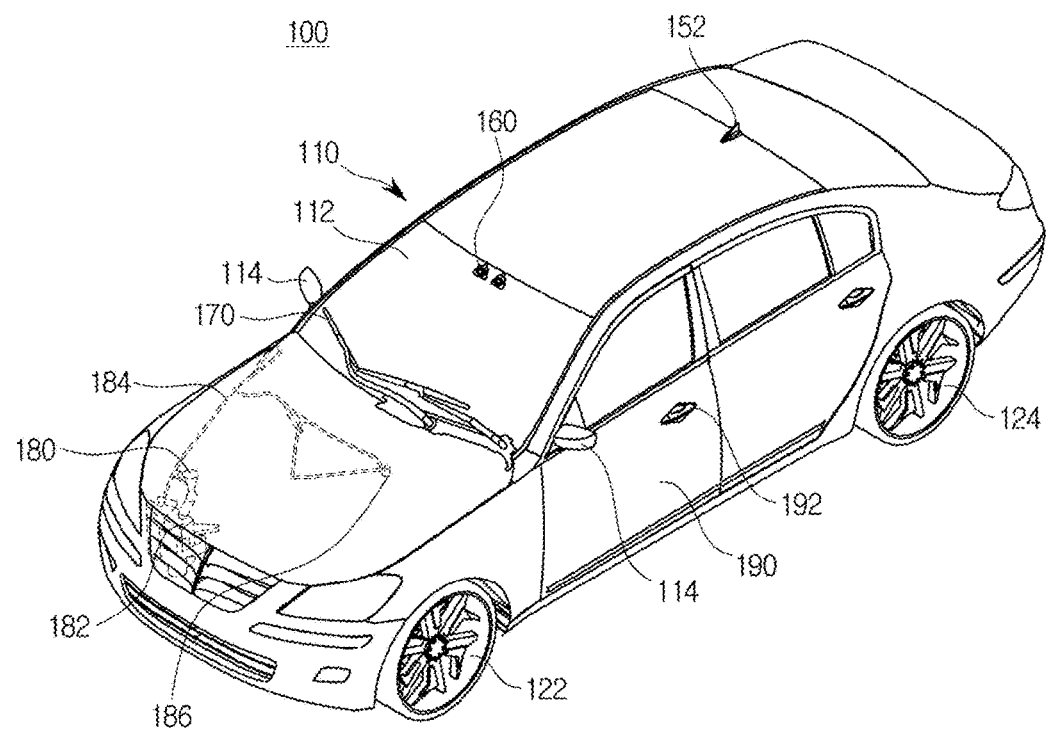
FIG. 1 is a view illustrating a vehicle in accordance with one embodiment of the present disclosure.

Reference will now be made in detail to embodiments of the present disclosure, examples of which are illustrated in the accompanying drawings, wherein like reference numerals refer to like elements throughout.

An aspect of the present invention provides a system for controlling operation of a wiper of a vehicle's windshield. The system includes a rain sensor for detecting amount or intensity of incident IR (infrared) light that are emitted from an IR emitter and reflected on a surface of a windshield.

In response to the driver's command to set a control mode of the windshield to an automatic control mode, using the amount/intensity of incident IR light, the computerized controller controls operation of the wiper in response to an indication of rain over a predetermined threshold or a metric representing amount/intensity of rain. The computerized controller determines or identifies a glass type or a tinting type of the windshield based on a frequency spectrum analysis of the incident IR lights. When the windshield's glass type or tinting type is identified among a predetermined set, the computerized controller adjust parameters for operating the windshield. In embodiments, the controller adjusts parameters for computing a metric representing amount or intensity of rain from the signals of the rain sensor such that the wiper operates at a desirable speed/frequency corresponding to level of incident rain for windshields of different glass types.

When a computerized controller is not able to identify one from the predetermined sets of glass/tinting type, the computerized controller increases sensitivity on the IR receiver of the rains sensor and repeats the process of glass/tinting type determining process with the increased sensitivity of IR receiver. When computerized controller is not able to identify one from the predetermined glass types or tinting types even with the maximum sensitivity of the IR receiver, the computer controller generates an error signal.

FIG. 1 is a view illustrating a vehicle in accordance with one embodiment of the present disclosure. Along with a description of an appearance of a vehicle 100 in accordance with one embodiment of the present disclosure, a rain sensor 160, a wiper 170, and a washer 180 which are involved in securing a front view of a driver will be described in FIG. 1.

A windshield 112 is provided on a front upper side of a main body and protects a passenger from winds while providing a front view to the passenger inside the vehicle 100. Since one of important roles of the windshield 112 is to secure the front view of a driver, if the windshield 112 is contaminated with rainwater or dust, it is difficult to secure the front view. Therefore, roles of the rain sensor 160, the wiper 170, and the washer 180 described above are very important. Outside mirrors 114 provide the passenger with a side view and a side rear view of the vehicle 100. The outside mirrors 114 may be provided on left and right doors 190 one by one, respectively.

The doors 190 are rotatably provided on left and right sides of the main body 110 so that the passenger can enter and exit the vehicle, and can shield the inside of the vehicle 100 from the outside when the doors are closed. The doors 190 can be locked/unlocked using a door locking device 192. Locking/Unlocking by the door locking device 192 is performed in a method in which a user directly operates a button or a level of the door locking device 192 by accessing the vehicle 100 or a method of remotely locking/unlocking using a remote controller at a position remote from the vehicle 100.

An antenna 152 is designed for receiving broadcasting/communication signals of telematics, DMB, digital TV, and GPS, and may be a multifunctional antenna for receiving various types of broadcasting/communication signals or a single functional antenna for receiving any one of the broadcasting/communication signals.

A front wheel 122 and a rear wheel 124 are positioned at the front and the rear of the vehicle 100, respectively, and are provided to be rotatable by receiving power from an engine.

The rain sensor 160 is installed so as to be in close contact with the inside (passenger room side) of the windshield 112. When a multifunction switch (refer to 510 of FIG. 5) is set to an "auto" mode, even if the driver does not operate the multifunction switch 510 to drive the wiper 170, the rain sensor 160 senses an intensity or an amount of rainwater by itself and helps to automatically control operation speed or operation time of the wiper 170. Moreover, when necessary, the rain sensor can allow a washer liquid to be automatically sprayed onto a surface of the windshield 112 by operating the multifunction switch 510 and controlling the washer 180. The multifunction switch 510 is a device which allows the driver to drive the wiper 170 and the washer 180.

When rainwater falls on an outer surface of the windshield 112 of the vehicle 100 while it is rainy, the rain sensor 160 senses the rainwater and measures rainfall. According to the rainfall measured by the rain sensor 160, speed (frequency) of the wiper 170 can be automatically controlled. When there is moisture on the surface of the windshield 112 due to other reasons as well as rain, the rain sensor 160 senses the moisture and generates a control signal so that the wiper 170 operates.

The wiper 170 is provided to remove rainwater, snow, pollutants, or the like from the surface of the windshield 112 of the vehicle 100. The wiper 170 is installed under a front bottom of windshield 112 of the vehicle 100 and removes rainwater, snow, or pollutants such as dust from the outer surface of the windshield 112 while swinging within a certain angle range by a motor.

In a case of pollutants such as dust and soil, it takes a relatively long time to be contaminated again once they are wiped off, and thus it is not necessary to frequently operate the wiper 170. However, rainwater or snowflakes continuously fall on the outer surface of the windshield 112 for a relatively long period of time in a rainy or snowy situation and bock a vision of the driver, and thus moisture on the outer surface of the windshield 112 needs to be continuously removed by periodically swinging the wiper 170 for a relative long period of time. When the wiper 170 is manually controlled, the driver directly operates the multifunction switch 510 and adjusts the speed (frequency) of the wiper 170 according to rainfall or snowfall.

When the multifunction switch 510 is set to the 'auto' mode in the vehicle 100 in which the rain sensor 160 is installed, the wiper 170 automatically operates in conjunction with the rain sensor 160. For example, when rain or snow falls during driving, the rain sensor 160 detects the rain or snow and sends a control signal to the wiper 170, and thereby the wiper 170 automatically operates without intervention by the driver and removes rainwater or snow from the surface of the windshield 112.

The washer 180 is a device for spraying a washer liquid onto the outer surface of the windshield 112 of the vehicle 100. The washer 180 includes a tank 182, a hose 184, and a nozzle 186. The tank 182 stores the washer liquid. A pump for transferring the washer liquid to the nozzle 186 may be added to the tank 182. After the washer liquid of the tank 182 is transferred to the nozzle 186 through the hose 184, the washer liquid is sprayed onto the surface of the windshield 112 through the nozzle 186. The spray of the washer liquid is performed by an operation of the multifunction switch 510 by the driver.

Figure 2:
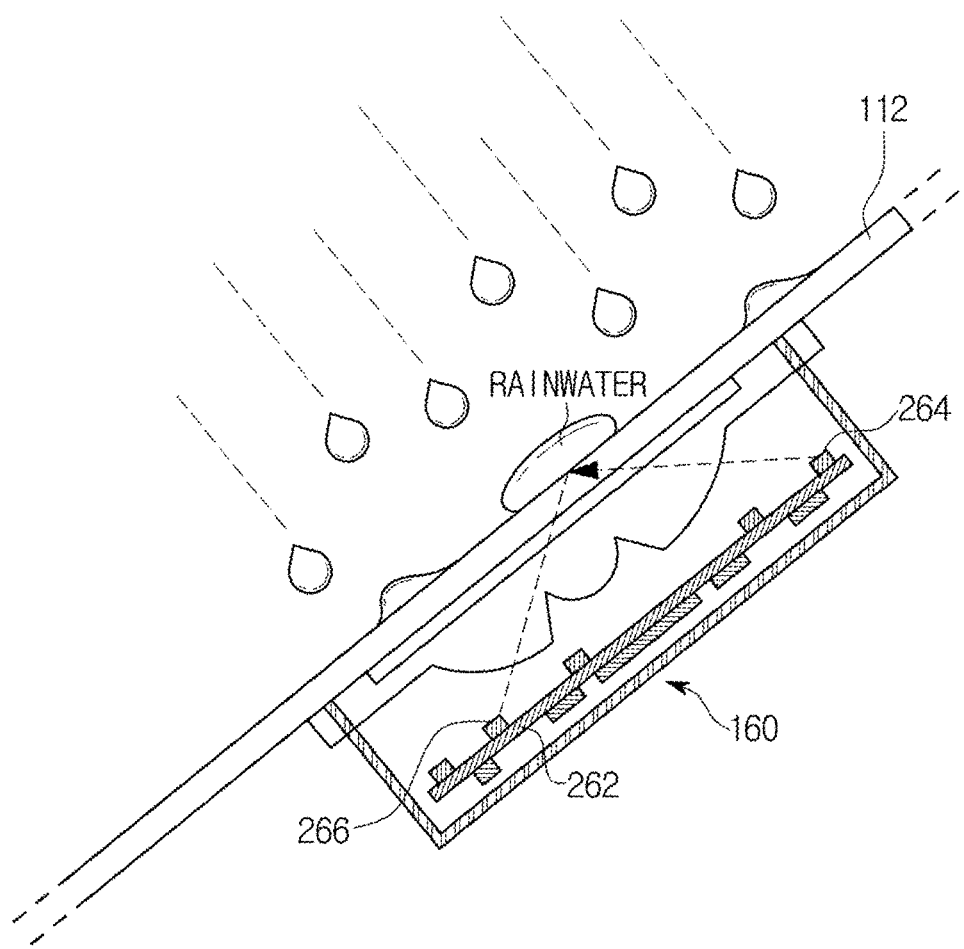
FIG. 2 is a diagram illustrating an internal structure through a side cross-sectional view of a rain sensor in accordance with one embodiment of the present disclosure.

FIG. 2 is a diagram illustrating an internal structure through a side cross-sectional view of the rain sensor 160 in accordance with one embodiment of the present disclosure. As illustrated in FIG. 2, the rain sensor 160 is installed with a light-emitting unit 264 and a light-receiving unit 266 spaced away from each other in a board 262. Light (for example, infrared light) emitted by the light-emitting unit 264 is reflected by the windshield 112 and incident onto the light-receiving unit 266. However, there are different amounts of light incident onto the light-receiving unit 266 between when there is moisture on the outer surface of the windshield 112 and when there is no moisture. For example, when there is no moisture on the outer surface of the windshield 112, light emitted by the light-emitting unit 264 is totally reflected by the windshield 112, and thus the light emitted by the light-emitting unit 264 is almost totally incident onto the light-receiving unit 266. In contrast, when there is moisture on the outer surface of the windshield 112, the light emitted by the light-emitting unit 264 is irregularly reflected due to the moisture at the windshield 112, and thus the light incident onto the light-receiving unit 266 is relatively reduced.

The rain sensor 160 may detect a rainy situation by using a difference occurring in an amount of light incident onto the light-receiving unit 266 according to an amount of moisture on the outer surface of the windshield 112. In other words, the rain sensor 160 can distinguish between a clear weather and a rainy situation and detect how much rainfall is in the rainy situation. By using a detection result of rainy situation by the rain sensor 160, the wiper 170 provided to operate in conjunction with the rain sensor 160 may be automatically controlled at appropriate speed corresponding to an amount of rain.

Figure 3:
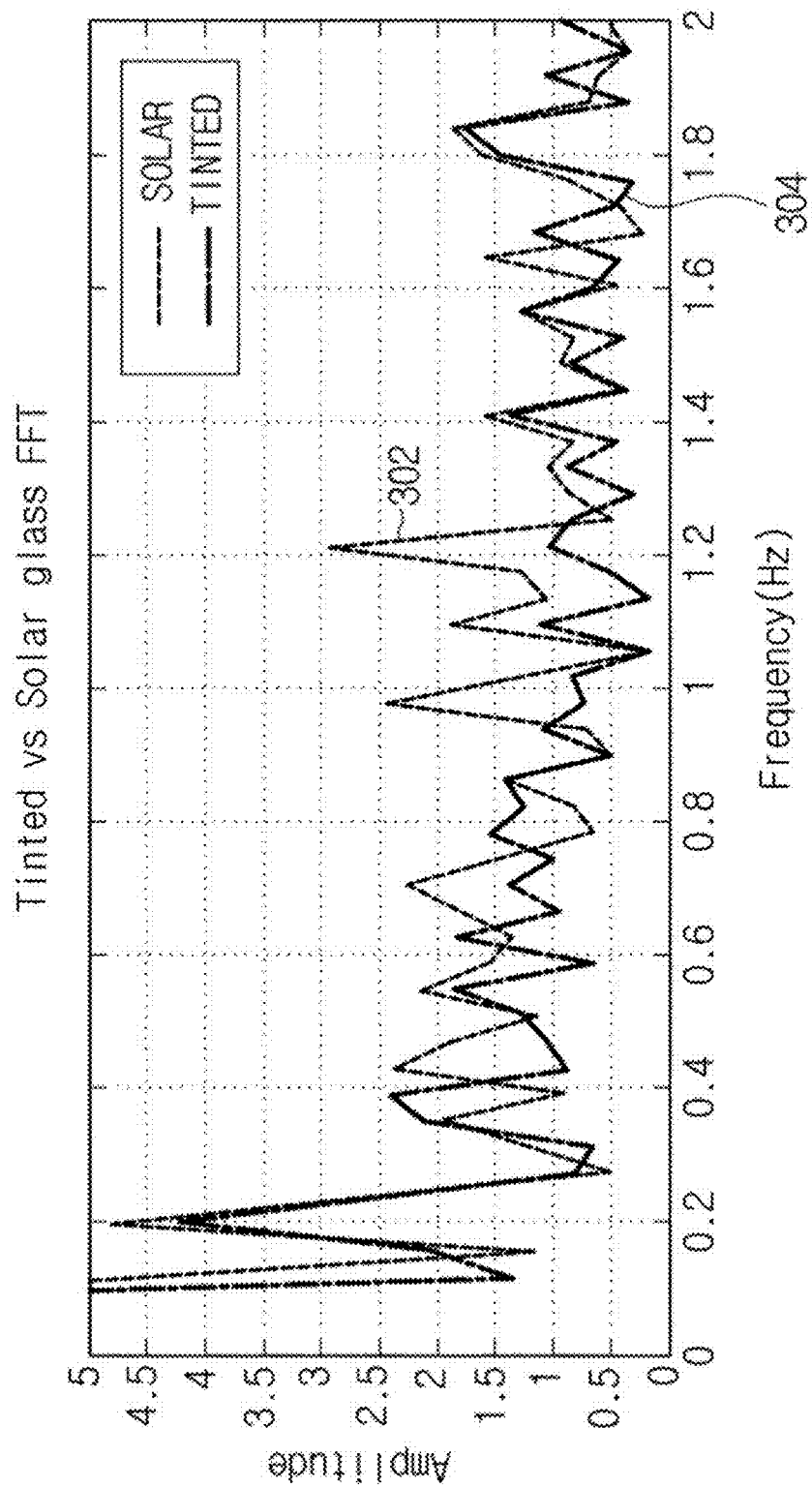
FIG. 3 is a diagram illustrating a method of determining a glass specification of a windshield of a vehicle in accordance with one embodiment of the present disclosure.

FIG. 3 is a diagram illustrating a method of determining a glass specification of the windshield of the vehicle in accordance with one embodiment of the present disclosure. FIG. 3 is a diagram illustrating a frequency-amplitude graph for determining the glass specification, particularly taking a case of a solar glass and a tinted glass as an example.

It is described as above that the rain sensor 160 emits light and determines whether it is rainy or not and rainfall through the amount of incident light after being reflected by the windshield 112. However, since a degree of light reflection varies depending on the glass specification of the windshield 112, a detection result of a rainy situation by the rain sensor 112 may be differently shown according to the glass specification of the windshield 112 even in the rainy situation with the same condition.

Basically, moisture on the surface of the windshield 112 irregularly reflects light emitted by the rain sensor 160, and if the windshield 112 has a glass specification with characteristics that further induce irregular reflection, irregular reflection due to the windshield 112 is added to irregular reflection due to rainwater, and thereby the rain sensor 160 may misrecognize that more amount of rainfall than actual rainfall falls. On the other hand, the rain sensor may have a measurement result of less rainfall than actual, and this may result in slower wiping speed control than actually required wiping speed.

The rain sensor 160 according to an embodiment of the present disclosure can accurately measure the actual rainfall in any glass specification by maintaining a uniform sensitivity all the time to be suitable for various glass specifications of the windshield 112.

For this, the rain sensor 160 according to an embodiment of the present disclosure determines the glass specification of the windshield 112 through a frequency analysis of light incident onto the light-receiving unit 266. In embodiments of the present disclosure, an analog-to-digital transformed signal is shown on a time domain by interpreting the light received by the light-receiving unit 266 as synthesis conditions of sinusoidal signals, magnitude of the amplitude is shown on a frequency domain as shown in FIG. 3 by performing Fast Fourier Transform on the analog-to-digital transformed signal, and then the glass specification of the windshield 112 is determined by analyzing a frequency-amplitude graph of FIG. 3.

In the frequency-amplitude graph shown in FIG. 3, it is known that a graph 302 of a solar glass and a graph 304 of a tinted glass have different frequency characteristics. For example, the graph 302 of a solar glass shows a characteristic that the amplitude is close to 3 at a band of 1.2 Hz. This characteristic makes it possible to identify the solar glass. The tinted glass also exhibits different frequency characteristics from the solar glass, and this makes it possible to identify the tinted glass.

Figure 4:
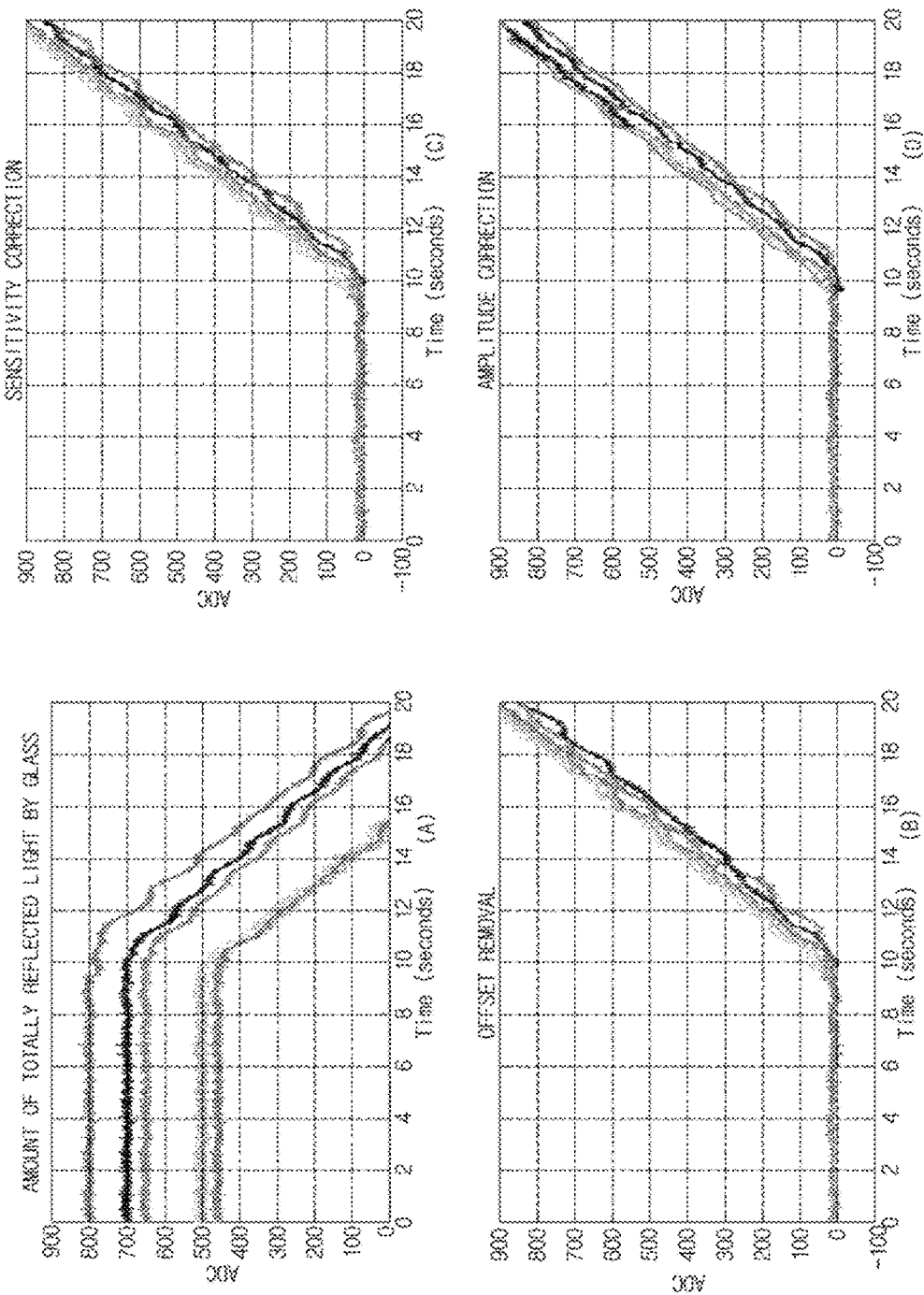
FIG. 4 is a diagram illustrating a process of applying tuning parameter for processing signals of different glass specifications by the rain sensor of the vehicle in accordance with one embodiment of the present disclosure.

FIG. 4 is a diagram illustrating a process of applying tuning parameters for processing signals of different glass specifications by the rain sensor of the vehicle in accordance with one embodiment of the present disclosure. A parameter tuning process shown in FIG. 4 prevents different rainfall detection results from occurring for respective glass specifications due to a difference in the glass specifications in a rainy situation under the same rainfall condition. In addition, by providing such a unified parameter tuning process, it is possible to cope with all of a plurality of glass specifications using only one signal processing logic.

First, FIG. 4(A) shows a result in which light totally reflected and incident onto the light-receiving unit 266 after being emitted by the light-emitting unit 264 of the rain sensor 160 is analog-to-digital transformed according to respective glass specifications of the windshield 112. As shown in FIG. 4(A), an offset, a slope, and an amplitude of a signal may vary according to respective glass specifications of the windshield 112. FIG. 4(B) is a graph in which the offsets of the signals of FIG. 4(A) are removed and the phase is inverted. By removing the offset of each of the signals, all of the signals become a signal starting from the same level and indicating only a difference in the slope. FIG. 4(C) is a result in which sensitivity of the signals of FIG. 4(B) is corrected. Since the sensitivity, that is, the slope, of each of the signals is corrected, all of signals of respective glass specifications have the same slope. FIG. 4(D) is a graph in which the amplitude of the signals of FIG. 4(C) is corrected. All of the signals of respective glass specifications have the same amplitude by correcting the amplitude of each of the signals.

In measuring the amount of rainwater falling on the outer surface of the windshield 112, detection signals of the rain sensor 160 also have a difference in offset, slope, amplitude, and the like due to a difference in characteristics of each of the various glass specifications under the same one rainfall condition. If the differences of the detection signals of the rain sensor 160 caused by the difference in the glass specifications are not corrected, different rainfall detection results can occur for each of various glass specifications even under the same one rainfall condition. For example, when irregular reflection characteristics of a glass specification A and a glass specification B are different from each other, the glass specification A fully recognizes a rainfall situation of 50 mm per hour as a rainfall situation of 50 mm per hour, but the glass specification B may misrecognize the rainfall situation of 50 mm per hour as a rainfall situation of 30 mm per hour.

The rain sensor 160 according to an embodiment of the present disclosure can provide an accurate rainfall detection result without a deviation by performing the unified parameter tuning for eliminating the deviation on rainfall detection signals of different various glass specifications as shown in FIGS. 4(A) to 4(D).

Figure 5:
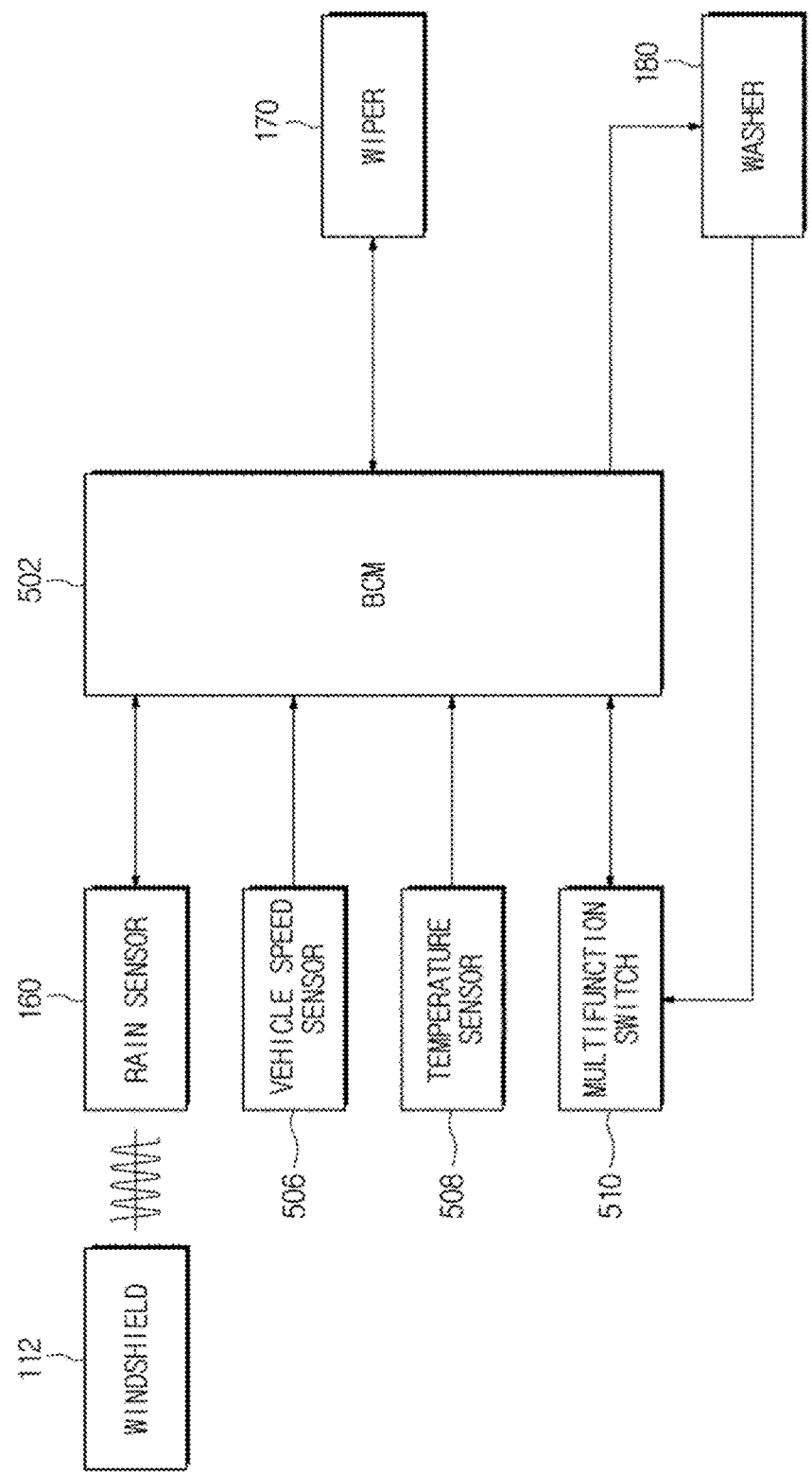
FIG. 5 is a diagram illustrating a control system of the vehicle in accordance with one embodiment of the present disclosure.

FIG. 5 is a diagram illustrating a control system of the vehicle in accordance with one embodiment of the present disclosure. Referring to FIG. 5, a connection relationship between the rain sensor 160 and the wiper 170 which are centered on a body control module (BCM) 502 will be described.

The body control module 502 referred to as BCM is a central control device which integrates and controls many electronic control units (ECUs). The rain sensor 160, a vehicle speed sensor 506, a temperature sensor 508, the multifunction switch 510, and the like are connected to an input side of the body control module 502. The wiper 170 is connected to an output side of the body control module 502.

The rain sensor 160 detects the glass specification of the windshield 112 and a rainfall situation, and transmits the information to the body control module 502. The body control module 502 transmits state information of the multifunction switch 510, the wiper 170, and the washer 180, and information on an outdoor temperature, vehicle speed, an error situation, and the like to the rain sensor 160.

For this, the body control module 502 receives vehicle speed information, outdoor temperature information, and state information of the multifunction switch 510 from each of the vehicle speed sensor 506, the temperature sensor 508, and the multifunction switch 510. Moreover, the body control module 502 receives the state information of the washer 180 from the multifunction switch 510.

In this manner, the body control module 502 of the vehicle 100 according to an embodiment of the present disclosure detects a glass specification of the windshield 112 and a rainfall situation, drives the wiper 170 according to a detected glass specification and a detected rainfall situation, and controls swing speed. Moreover, the body control module 502 controls the washer 180 while driving the wiper 170 to allow the washer liquid to spray onto the surface of the windshield 112. The washer liquid sprayed onto the windshield 112 doubles a debris removal effect by a swing motion of the wiper 170.

Figure 6:
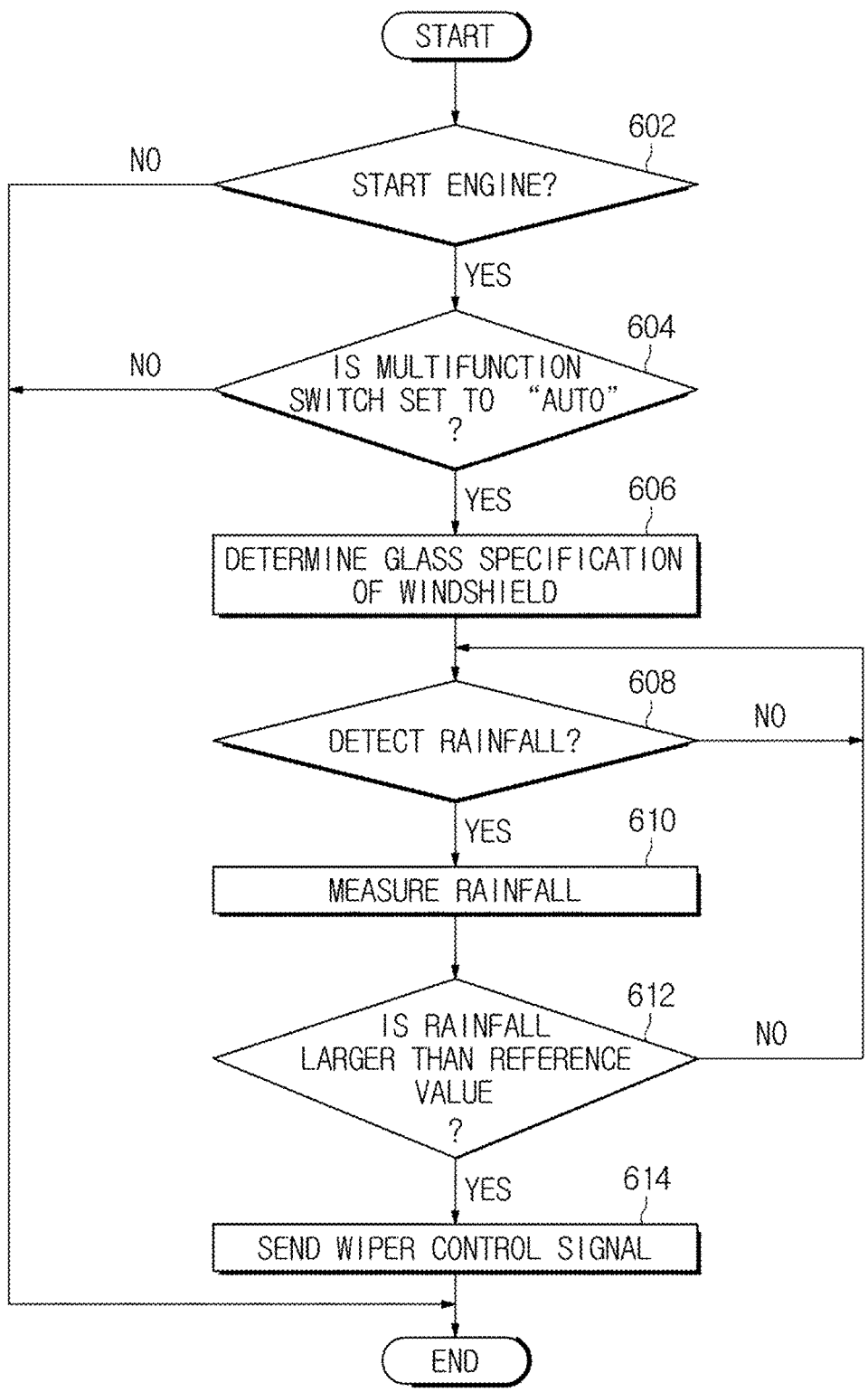
FIG. 6 is a flowchart illustrating a method of controlling the vehicle in accordance with one embodiment of the present disclosure.

FIG. 6 is a flowchart illustrating a method of controlling the vehicle in accordance with one embodiment of the present disclosure. FIG. 6 describes a process in which the rain sensor 160 according to an embodiment of the present disclosure determines a glass specification, measures rainfall, generates and sends a control signal for automatically controlling the wiper 170.

When the driver gets on the vehicle 100 and starts an engine (602), and sets the multifunction switch 510 to the 'auto" mode (604), the body control module 502 determines a glass specification of the windshield 112 and prepares to detect a rainfall situation by activating the rain sensor 160 in response to the 'auto' mode setting of the multifunction switch 510.

When the body control module 502 activates the rain sensor 160, the rain sensor 160 first determines a glass specification of the windshield 112 (606). As described in FIG. 3 earlier, the rain sensor 160 according to an embodiment of the present disclosure determines the glass specification through a frequency analysis of light incident onto the light-receiving unit 266. That is, the rain sensor 160 shows an analog-to-digital transformed value on the time domain by interpreting the light incident onto the light-receiving unit 266 as the synthesis condition of sinusoidal signals, shows the magnitude of the amplitude on a frequency domain by performing Fast Fourier Transform on the value, and determines the glass specification of the windshield 112 through an analysis of a frequency-amplitude graph as shown in FIG. 3. A determination result of the glass specification is transmitted to the body control module 502 by the rain sensor 160.

After the glass specification of the windshield 112 is determined, the rain sensor 160 monitors whether it is rainy or not during an operation of the vehicle 100 (608). During a winter season, the rain sensor 160 may monitor whether it is snowy or not. When an external temperature detected by the temperature sensor 508 is a given temperature or below, the rain sensor may determine that it is winter.

If it is determined to be in a rainfall situation ('Yes' in 608), current rainfall is measured (610). The rainfall may be determined through the amount of light incident onto the light-receiving unit 266 of the rain sensor 160. In a case of the light emitted by the light-emitting unit 264 of the rain sensor 160, a degree of irregular reflection is determined based on an amount of rainwater falling on the surface of the windshield 112, and thus when the amount of rainwater is large (that is, when there is a lot of rainfall, the degree of irregular reflection increases and the amount of light incident onto the light-receiving unit 266 decreases, and when the amount of rainwater is small (that is, there is small rainfall, the degree of irregular reflection decreases and the amount of light incident onto the light-receiving unit 266 increases. Accordingly, the current rainfall may be determined depending on how much light is incident onto the light-receiving unit 266 of the rain sensor 160.

When the measurement of the rainfall is completed, it is checked whether the current rainfall exceeds a predetermined reference value (612). Here, "the predetermined reference value" is a reference value for deciding whether to drive the wiper 170. Even in the rainfall situation, it is necessary to check whether the rainfall situation is large enough to drive the wiper 170 or too slight to drive the wiper 170.

When the rainfall exceeds the predetermined reference value ('Yes' in 612), the rain sensor 160 transmits information on the rainfall situation to the control module 502, and the body control module 502 generates a wiper control signal corresponding to the information on the rainfall transmitted by the rain sensor 160 and drives the wiper 170. When there is large rainfall, the body control module 502 controls that the wiper 170 operates fast and, when there is small rainfall, speed of the wiper 170 also decreases.

Figure 7:
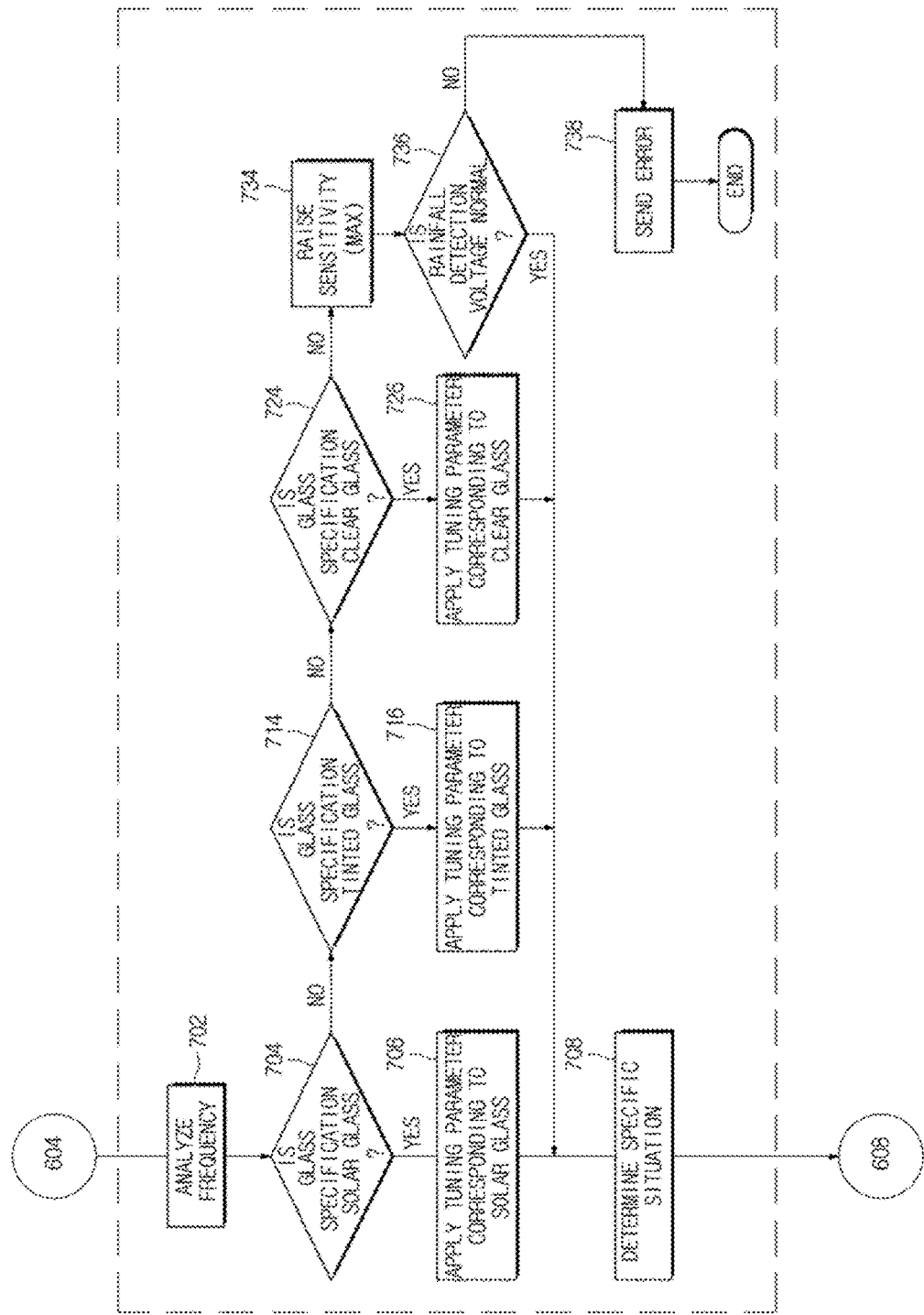
FIG. 7 is a flowchart illustrating a method of determining the glass specification of the windshield in the method of controlling the vehicle shown in FIG. 6.

FIG. 7 is a flowchart illustrating a method of determining a glass specification of the windshield in the method of controlling the vehicle shown in FIG. 6. In FIG. 7, a frequency analysis process for determining the glass specification of the windshield 112 and a correction process will be described in detail.

In the description of FIG. 6, when the driver gets on the vehicle 100, starts the engine (602), and sets the multifunction switch 510 to the "AUTO" mode (604), it has been mentioned that the body control module 502 activates the rain sensor 160 to determine the glass specification of the windshield 112 and to prepare for measurement of rainfall while detecting whether it is rainy. A step (606) of determining the glass specification of the windshield to be performed subsequently is performed as follows.

First, the rain sensor 160 analyzes a frequency of the light incident onto the light-receiving unit 266 (702). In this frequency analysis, as described in FIG. 3, an analog-to-digital transformed signal is shown on the time domain by interpreting the light incident onto the light-receiving unit 266 as the synthesis condition of sinusoidal signals and, an amplitude magnitude is shown on the frequency domain as shown in FIG. 3 by performing fast Fourier transform on the analog-to-digital transformed signal, and then the glass specification of the windshield 112 is determined by analyzing the frequency-amplitude graph of FIG. 3.

The rain sensor 160 checks whether the glass specification of the windshield 112 is the solar glass (704). If it is checked that the glass specification of the windshield 112 is the solar glass ('Yes' in 704), tuning parameters for the solar glass are applied (706). As described in FIGS. 4(A) to 4(D), the application of the tuning parameters may help to obtain the same rainfall detection result even under a condition of different glass specifications by performing parameter tuning such as phase inversion, offset removal (B), sensitivity correction (C), amplitude correction (D), and the like on the solar glass to eliminate deviations between signals of various glass specifications.

Subsequently, the rain sensor 160 determines whether it is a specific situation in consideration of an external temperature and vehicle speed of the vehicle 100 (788). Even if the determination of the glass specification and a corresponding parameter tuning is completed, a specific situation which cannot be detected by the rain sensor 160 may occur. For example, when the external temperature is extremely high or low or when the vehicle travels at high speed, it may be difficult to measure an accurate rainfall state only by detecting rainwater formed on the surface of the windshield 112. Accordingly, a process of determining whether it is the specific situation in consideration of the external temperature and the vehicle speed is required. When it is determined to be the specific situation, it is preferable to consider a specific situation corresponding to a result of the determination of the glass specification. In particular, information related to occurrence of this situation is provided from the body control module 502.

If the glass specification of the windshield 112 is not the solar glass ('No' in 704), the rain sensor 160 checks whether the glass specification of the windshield 112 is a tinted glass (714). If it is checked that the glass specification of the windshield 112 is the tinted glass ('Yes' in 714), tuning parameters for the tinted glass are applied (716). The application of the tuning parameters, as described in FIGS. 4(A) to 4(D), may help to obtain the same rainfall detection result even under a condition of different glass specifications by performing parameter tuning such as phase inversion, offset removal (B), sensitivity correction (C), amplitude correction (D), and the like on the solar glass to eliminate deviations between signals of various glass specifications. When the application of the tinted glass tuning parameters is completed, the procedure proceeds to the step of determining a specific situation described above (788).

If the glass specification of the windshield 112 is not the tinted glass ('No' in 714), the rain sensor 160 checks whether the glass specification of the windshield 112 is a clear glass (724). If it is checked that the glass specification of the windshield 112 is the clear glass ('Yes' in 724), tuning parameters for the clear glass are applied (726). The application of the tuning parameters, as described in FIGS. 4(A) to 4(D), may help to obtain the same rainfall detection result even under a condition of different glass specifications by performing parameter tuning such as phase inversion, offset removal (B), sensitivity correction (C), amplitude correction (D), and the like on the solar glass to eliminate deviations between signals of various glass specifications. When the application of the clear glass tuning parameters is completed, the procedure proceeds to the step of determining a specific situation described above (788).

If the windshield 112 is none of specifications of the solar glass, the tinted glass, and the clear glass, that is, when the windshield 112 is a glass other than the solar glass, the tinted glass, and the clear glass ('No' in 724), the rain sensor 160 adjusts the sensitivity of the light-receiving unit 266 to the maximum (734), and checks whether a rainfall detection voltage at this time is normal or not (736). When it is checked that the rainfall detection voltage is normal ('Yes' in 736), the procedure proceeds to the step of determining a specific situation described above (788).

On the other hand, when it is checked that the rainfall detection voltage is abnormal ('No' in 736), the rain sensor 160 determines that a normal rainfall detection is impossible and sends an error signal to the body control module 502. The body control module 502 which receives the error signal from the rain sensor 160 displays a fact of an error occurrence of the rain sensor 160 through a dashboard or a display so that the driver may recognize the error occurrence.

As described above, when the determination of the glass specification of the windshield 112 is completed, the procedure proceeds to 608 of FIG. 6 as described above and the rain sensor 160 monitors whether rainfall occurs, that is, whether it is rainy during the operation of the vehicle in a state in which the glass specification of the windshield 112 is determined.

The above description is merely exemplary description of technical concepts, and it would be appreciated by those skilled in the art that various modifications, substitutions, and alterations may be made hereto without departing from essential characteristics of the disclosure, the scope of which is defined in the claims and their equivalents.

Although a few embodiments of the present disclosure have been shown and described, it would be appreciated by those skilled in the art that changes may be made in these embodiments without departing from the principles and spirit of the disclosure. Therefore, the above-described embodiments and accompanying drawings are not intended to limit the technical concepts but are intended to describe the technical concepts, and the scope of the technical concepts is not limited by these embodiments and the accompanying drawings. The scope of the technical concepts should be defined in accordance with following claims and all the technical concepts within the equivalent scope should be construed as being included in the scope of the present disclosure.

What is claimed is:

1. A method of determining a glass specification of a rain sensor comprising:
    determining, by the rain sensor, a glass specification of a windshield from a light-receiving signal obtained by receiving light reflected by the windshield of a vehicle; and
    eliminating a deviation between light-receiving signals by glass specification, which is caused by a difference in glass specification, by applying parameter tuning according to the glass specification to the light-receiving signal.

2. The method of determining a glass specification of a rain sensor according to claim 1, wherein the glass specification of the windshield is determined through a frequency analysis of the light-receiving signal.

3. The method of determining a glass specification of a rain sensor according to claim 1, wherein the parameter tuning according to the glass specification includes at least one of offset removal, phase inversion, sensitivity correction, and amplitude correction of the light-receiving signal.

4. The method of determining a glass specification of a rain sensor according to claim 3, wherein, when the glass specification of the windshield matches up with a pre-determined glass specification, the deviation is eliminated by applying parameter tuning corresponding to the pre-determined glass specification.

5. The method of determining a glass specification of a rain sensor according to claim 4, wherein,
    when the glass specification of the windshield does not match up with the pre-determined glass specification, sensitivity of the rain sensor is raised and a detection voltage of the rain sensor is measured, and
    when the detection voltage of the rain sensor is not within a normal range, an error signal indicating that the rain sensor does not normally operate is generated.

6. The method of determining a glass specification of a rain sensor according to claim 5, wherein, when the detection voltage of the rain sensor is measured, the sensitivity of the rain sensor is adjusted to the maximum.

7. A method of measuring rainfall of a rain sensor comprising:
    determining, by the rain sensor, a glass specification of a windshield from a light-receiving signal obtained by receiving light reflected by the windshield of a vehicle;
    eliminating a deviation between light-receiving signals by glass specification, which is caused by a difference in glass specification, by applying parameter tuning according to the glass specification to the light-receiving signal; and
    estimating rainfall on a surface of the windshield from a magnitude of the light-receiving signal from which the deviation is eliminated.

8. The method of measuring rainfall of a rain sensor according to claim 7, wherein the glass specification of the windshield is determined through a frequency analysis of the light-receiving signal.

9. The method of measuring rainfall of a rain sensor according to claim 7, wherein the parameter tuning according to the glass specification includes at least one of offset removal, phase inversion, sensitivity correction, and amplitude correction of the light-receiving signal.

10. The method of measuring rainfall of a rain sensor according to claim 8, wherein, when the glass specification of the windshield matches up with a pre-determined glass specification through the frequency analysis of the light-receiving signal, the deviation is eliminated by applying parameter tuning corresponding to the pre-determined glass specification.

11. The method of measuring rainfall of a rain sensor according to claim 10, wherein,
when the glass specification of the windshield does not match up with the pre-determined glass specification, sensitivity of the rain sensor is raised and a detection voltage of the rain sensor is measured; and
when the detection voltage of the rain sensor is not within a normal range, an error signal indicating that the rain sensor does not normally operate is generated.

12. The method of measuring rainfall of a rain sensor according to claim 11, wherein, when the detection voltage of the rain sensor is detected, the sensitivity of the rain sensor is adjusted to the maximum.

13. A method of controlling a wiper of a vehicle comprising:
generating a rain sensor control signal for activating a rain sensor when a wiper operating means of the vehicle is set to an 'AUTO' mode;
determining, by the rain sensor, a glass specification of a windshield from a light-receiving signal obtained by receiving light reflected by the windshield of the vehicle in response to the rain sensor control signal;
eliminating a deviation between light-receiving signals by glass specification, which is caused by a difference in glass specification, by applying parameter tuning according to the glass specification to the light-receiving signal;
estimating rainfall on a surface of the windshield from a magnitude of the light-receiving signal from which the deviation is eliminated; and
generating a wiper control signal for controlling a speed of the wiper to correspond to the estimated rainfall.

14. A vehicle comprising:
a rain sensor which determines a glass specification of a windshield from a light-receiving signal obtained by receiving light reflected by the windshield of the vehicle, eliminates a deviation between light-receiving signals by glass specification, which is caused by a difference in glass specification, by applying parameter tuning according to the glass specification to the light-receiving signal, and estimates rainfall on a surface of the windshield from a magnitude of the light-receiving signal from which the deviation is eliminated; and
a control unit which generates a wiper control signal for controlling a speed of a wiper to correspond to the estimated rainfall.

15. The vehicle according to claim 14, wherein the rain sensor determines the glass specification of the windshield through a frequency analysis of the light-receiving signal.

16. The vehicle according to claim 14, wherein the rain sensor performs at least one of offset removal, phase inversion, sensitivity correction, and amplitude correction of the light-receiving signal when the parameter tuning according to the glass specification is performed.

17. The vehicle according to claim 16, wherein, when the glass specification of the windshield matches up with a pre-determined glass specification, the rain sensor eliminates the deviation by applying parameter tuning corresponding to the pre-determined glass specification.

18. The vehicle according to claim 17, wherein,
when the glass specification of the windshield does not match up with the pre-determined glass specification, the rain sensor raises sensitivity of the rain sensor and measures a detection voltage of the rain sensor, and
when the detection voltage of the rain sensor is not within a normal range, the rain sensor generates an error signal indicating that the rain sensor does not normally operate.

19. The vehicle according to claim 18, wherein, when the detection voltage of the rain sensor is measured, the sensitivity of the rain sensor is adjusted to the maximum.

20. A rain sensor comprising:
a light-emitting unit which emits light to a windshield of a vehicle; and
a light-receiving unit which receives light reflected by the windshield and generates a light-receiving signal,
wherein a glass specification of the windshield is determined from the light-receiving signal and a deviation between light-receiving signals by glass specification, which is caused by a difference in glass specification, is eliminated by applying parameter tuning according to the glass specification to the light-receiving signal.

* * * * *